United States Patent
Kajitani

[11] Patent Number: 5,394,281
[45] Date of Patent: Feb. 28, 1995

[54] MAGNETIC HEAD LOADING/UNLOADING MECHANISM WITH A RAMP HAVING AN OSCILLATING FUNCTION

[75] Inventor: Hiroshi Kajitani, Tokyo, Japan
[73] Assignee: NEC Corporation, Tokyo, Japan
[21] Appl. No.: 983,157
[22] Filed: Nov. 30, 1992
[30] Foreign Application Priority Data Nov. 29, 1991 [JP] Japan .................. 3-315867

[51] Int. Cl.6 .............. G11B 5/54; G11B 21/22
[52] U.S. Cl. ..................... 360/105; 360/109; 360/75
[58] Field of Search .............. 360/104–106, 360/109, 75

[56] References Cited

U.S. PATENT DOCUMENTS

| | | | |
|---|---|---|---|
| 4,535,374 | 8/1985 | Anderson et al. | 360/103 |
| 4,933,785 | 6/1990 | Morehouse et al. | 360/137 |
| 5,027,241 | 6/1991 | Hatch et al. | 360/105 |
| 5,079,652 | 1/1992 | Ishida et al. | 360/75 |
| 5,103,361 | 4/1992 | Nagatsuka et al. | 360/109 |
| 5,148,339 | 9/1992 | Yoshida | 360/109 |
| 5,189,569 | 2/1993 | Kurosawa | 360/75 |

FOREIGN PATENT DOCUMENTS

| | | |
|---|---|---|
| 2652438 | 3/1991 | France . |
| 63-83979 | 4/1988 | Japan . |
| 63-161573 | 7/1988 | Japan . |
| 0250369 | 2/1990 | Japan . |
| 2150736 | 7/1985 | United Kingdom . |

OTHER PUBLICATIONS

Sugaya, "Magnetic Head Loading/Unloading Device For Magnetic Field Modulation", Abstract No. 3-104069, (1989).
Kajitani, "Magnetic Disk Device", Abstract 3-176805, (1991).

Primary Examiner—Robert S. Tupper
Assistant Examiner—David D. Davis
Attorney, Agent, or Firm—Foley & Lardner

[57] ABSTRACT

A loading/unloading mechanism for loading and unloading a magnetic head mounted on a magnetic disk drive for recording data in a magnetic recording medium. A suspension mechanism exerts a predetermined load on a flying head slider while the disk drive is not operated. A ramp mechanism supports the suspension mechanism and moves the head slider away from the surface of the medium. The whole or part of the ramp mechanism is constituted by an oscillation mechanism having a piezoelectric element. The static frictional force acting on the suspension mechanism and ramp mechanism is replaced with a dynamic frictional force to thereby reduce the friction. This saves power at the beginning of a loading operation and facilitates the control over the movement of the head slider caused by a positioner actuator.

1 Claim, 2 Drawing Sheets

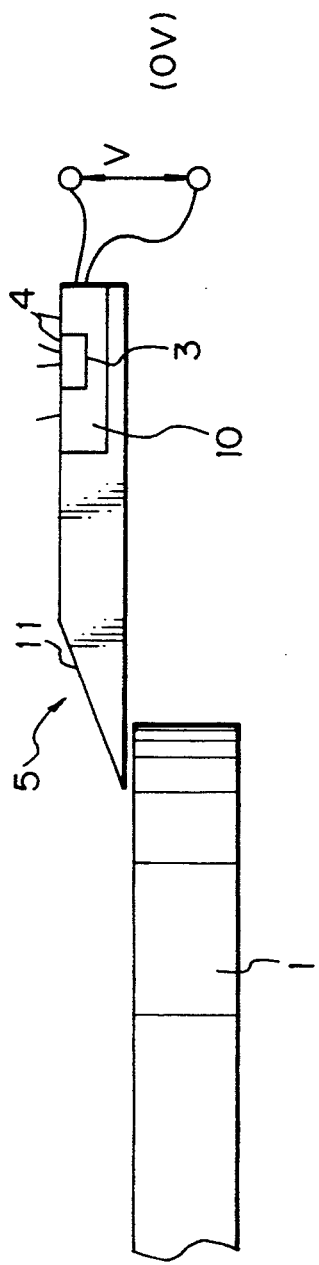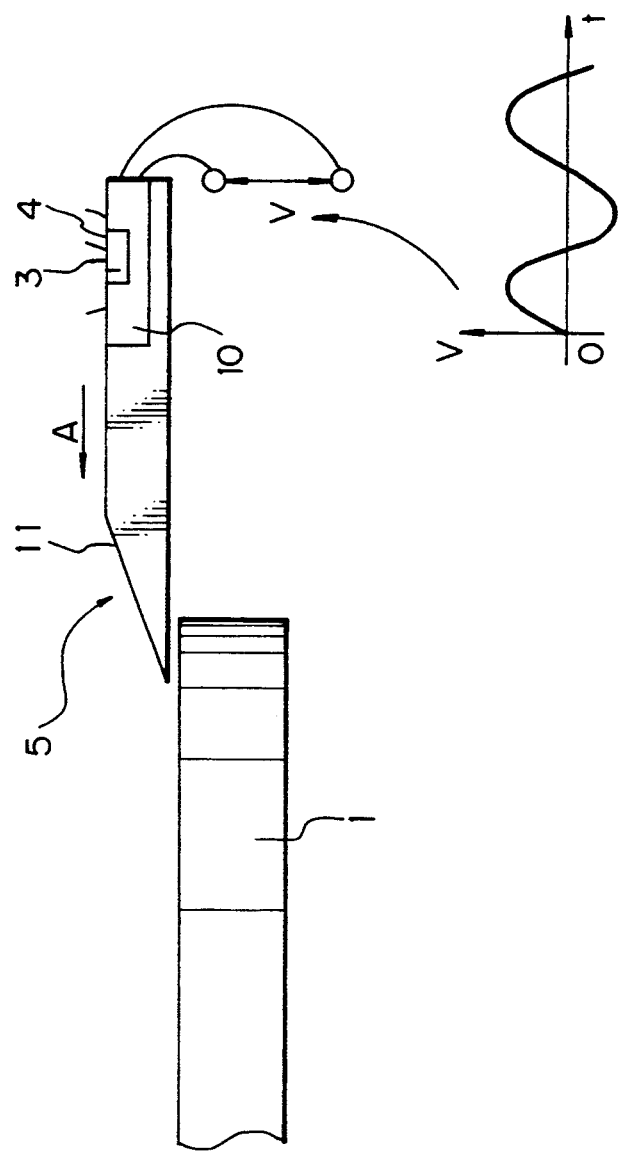

MAGNETIC HEAD LOADING/UNLOADING MECHANISM WITH A RAMP HAVING AN OSCILLATING FUNCTION

BACKGROUND OF THE INVENTION

The present invention relates to a loading/unloading mechanism for loading and unloading a magnetic head mounted on a magnetic disk drive for recording data in a magnetic recording medium.

It has been customary to start and stop the operation of a magnetic disk drive by a contact start/stop (CSS) system. The CSS system starts and stops the operation of the disk drive while maintaining a magnetic disk and a flying head slider in contact with each other. The prerequisite to the CSS system is that the surface of the medium be roughened to a degree sufficient to prevent the head slider and medium from sticking together while the disk drive is not in operation. This brings about a problem that the head slider has to fly more than necessary, obstructing the increase in recording density. In addition, friction particular to the CSS system and dust particles ascribable to the friction cannot be eliminated.

Moreover, to meet the increasing recording density, access speed and transfer rate, attempts for reducing the flying amount of the head slider are under way. This in turn requires the pressure generating surface of the head slider and the surface of the magnetic disk to be smoother, aggravating the probability of head crush ascribable to the above-mentioned dust particles and the adhesion of disk and head slider.

On the other hand, with a miniature magnetic disk drive mounted on, for example, a lap top computer, there is a tendency that the disk drive is automatically damaged when a predetermined period of time expires without any input for the purpose of saving power. Hence, there is an increasing demand for a CSS resistive characteristics sufficient to meet the increase in the frequency of CSS operation. Another requisite for the disk drive is high resistivity to impacts. In the CSS system, intense impacts would damage the disk, head slider, head, etc.

In light of the above, a loading/unloading mechanism has been developed which causes the disk drive to start and stop operation without the flying head slider contacting the magnetic disk. A loading/unloading mechanism of the type using a ramp mechanism causes the ramp mechanism to support part of a suspension mechanism while the disk drive is out of operation. The suspension mechanism is so designed as to exert a predetermined load on a flying head slider when the head slider is held in a usual flying state. However, when the suspension mechanism is supported by the ramp mechanism, the former exerts a heavier load on the latter.

When the head is to be loaded on the medium, a positioner actuator exerts a force on the suspension mechanism which is greater than the static frictional force ascribable to the contact load, aggravating the power consumption. In the event of loading, since the position of the head slider noticeably influences the contact/noncontact of the head slider with the medium, the speed of the positioner actuator has to be controlled to prevent undesirable oscillations from occurring in the suspension mechanism. However, controlling the speed of the positioner actuator with accuracy is extremely difficult since the static frictional force is susceptible to the environment.

SUMMARY OF THE INVENTION

It is, therefore, an object of the present invention to provide a loading/unloading mechanism for a magnetic head of a magnetic disk drive which consumes a minimum of power, controls the loading speed with accuracy, and reduces the probability of contact of a head and a recording medium to thereby enhance reliable operations.

In accordance with the present invention, a loading/unloading mechanism for loading and unloading a magnetic head of a magnetic disk drive for recording data in a magnetic recording medium comprises a flying head slider carrying the magnetic head, a suspension mechanism for exerting a predetermined load on the flying head slider while the magnetic disk drive is not operated, and a ramp mechanism supporting the suspension mechanism for moving the magnetic head away from the surface of the magnetic recording medium.

BRIEF DESCRIPTION OF THE DRAWINGS

The above and other objects features and advantages of the present invention will become more apparent from the following detailed description taken with the accompanying drawings in which:

FIGS. 3A and 3B are views demonstrating the operation of the ramp mechanism in the event of loading.

DESCRIPTION OF THE PREFERRED EMBODIMENT

Figure 1:
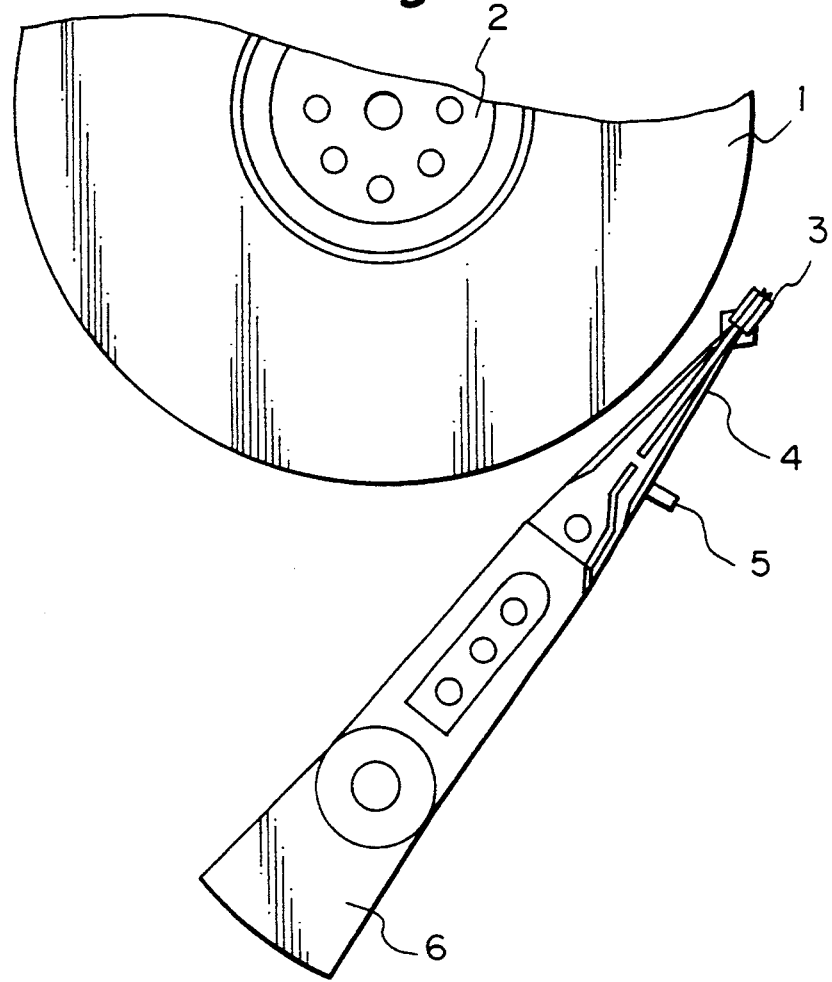
FIG. 1 is plan view showing a loading/unloading mechanism embodying the present invention.

Referring to FIG. 1 of the drawings, a loading/unloading mechanism embodying the present invention is shown. As shown, the mechanism has a magnetic disk or similar magnetic recording medium 1 affixed to a spindle 2, a positioner actuator 6, a suspension mechanism 4 affixed to the positioner actuator 6, a floating head slider 3 supported by the suspension mechanism 4, and a ramp mechanism 5. While a disk drive on which the loading/unloading mechanism is mounted is not being operated, the ramp mechanism 5 supports the suspension mechanism 4 and maintains the head slider 3 moved away from the medium 1. At the start-up of the disk drive, the positioner actuator 6 loads the head slider 3 on the medium 1 at a predetermined speed after the medium 1 has reached a predetermined rotation speed. When the operation of the disk drive is stopped, the positioner actuator 6 unloads head slider 3 from the medium 1 after the medium has reached the predetermined speed.

Figure 2:
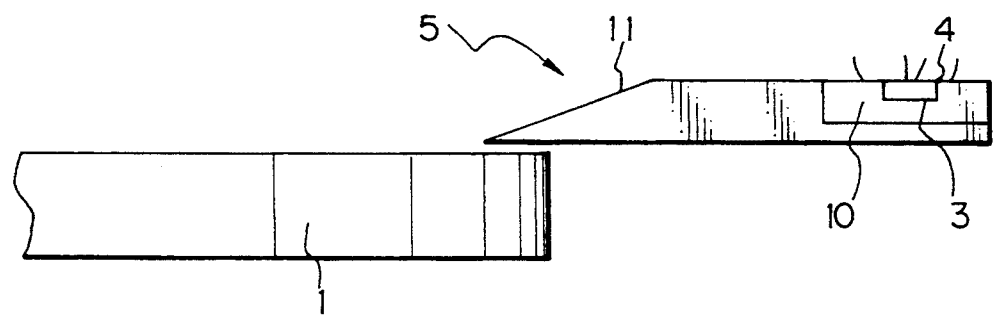
FIG. 2 is a side elevation of a ramp mechanism included in the embodiment.

The ramp mechanism 5 included in the embodiment is shown specifically in FIG. 2. As shown, the ramp mechanism 5 is made up of a piezoelectric element 10 and a cam 11.

A reference will be made to FIGS. 3A and 3B for describing the operations for loading and unloading the head slider 3 having the ramp mechanism 5. FIG. 3A shows a condition wherein the disk drive is not being operated. In this condition, the suspension mechanism 4 is supported on the piezoelectric element 10 which forms part of the ramp mechanism 5, maintaining the head slider 3 spaced apart from the medium 1. As shown in FIG. 3B, at the beginning of a loading operation, a sinusoidal high frequency voltage is applied to the piezoelectric element 10 to cause it to finely oscillate. Here, the term "high frequency" refers to a frequency higher than the resonance frequencies of the suspension mechanism 4, positioner actuator 6 and so forth and not exciting their oscillation modes. At the instant when the static frictional force ascribable to the contact of the mechanisms 4 and 5 is replaced with a dynamic frictional force, the positioner actuator 6 moves the head slider 3 in a direction indicated by an arrow A in FIG. 3B. As a result, the head slider 3 is loaded on the medium 1.

In summary, it will be seen that the present invention provides a loading/unloading mechanism which reduces friction by replacing the static frictional force acting on a head slider support mechanism and a ramp mechanism at the beginning of loading with a dynamic frictional force. With the invention, therefore, it is possible to save power at the beginning of a loading operation.

Further, since the frictional resistance is substantially constant, the speed at which the head slider should be moved by a positioner actuator can be controlled with ease. Since the head slider support mechanism causes a minimum of oscillations, the inclination of the head slider can be reduced. As the result, the loading/unloading mechanism prevents a magnetic head and the magnetic recording medium from contacting each other and, therefore, operates with high reliability.

Various modifications will become possible for those skilled in the art after receiving the teachings of the present disclosure without departing from the scope thereof. For example, the piezoelectric element 10 may be replaced with any other suitable oscillation mechanism so long as it is movable relative to the suspension mechanism 4.

What is claimed is:

1. A loading/unloading mechanism for loading and unloading a magnetic head of a magnetic disk drive, said mechanism comprising:

a magnetic recording medium affixed to a spindle;

a positioner actuator;

a suspension mechanism affixed to the positioner actuator;

a floating head slider supported by the suspension mechanism; and a ramp mechanism, wherein, when said magnetic disk drive on which said loading/unloading mechanism is mounted is not being operated, said ramp mechanism supports said suspension mechanism and maintains said floating head slider in a position moved away from said magnetic recording medium and wherein at start-up of said magnetic disk drive, said positioner actuator loads said floating head slider onto said magnetic recording medium at a predetermined speed after the medium has reached a predetermined rotation speed, and when the operation of said magnetic disk drive has stopped, said positioner actuator unloads said floating head slider from said magnetic recording medium after said magnetic recording medium has reached said predetermined speed, wherein said ramp mechanism comprises a piezoelectric element and a cam, and wherein, when said magnetic disk drive is not being operated, said suspension mechanism is supported on said piezoelectric element which forms part of said ramp mechanism, maintaining said floating head slider spaced apart from said magnetic recording medium, and wherein at the beginning of a loading operation, a sinusoidal high frequency voltage is applied to said piezoelectric element causing said piezoelectric element to oscillate at a frequency which is higher than the resonance frequencies of said suspension mechanism and said positioner actuator, and at an instant when a static frictional force ascribable to the contacts of said suspension mechanism and said ramp mechanism is replaced with a dynamic frictional force, said positioner actuator moves said floating head slider such that said floating head slider is loaded onto said magnetic recording medium.

* * * * *